BEST AVAILABLE COPY
(119.) CHARLES F. HAWLEY.
Improvement in the mode of Strengthening the Angles of Bent Metallic Bars.
No. 4,694. Reissued Jan. 2, 1872.
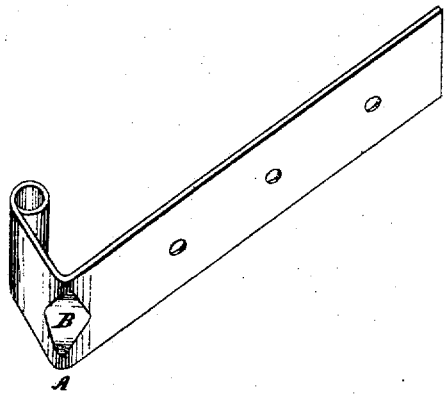
Witnesses:
Solon S. Lemon
A. W. Hart
Inventor:
C. F. Hawley
Per Munn & Co
Attorneys.
AM. PHOTO-LITHOGRAPHIC CO. N.Y. (OSBORNE'S PROCESS.)

UNITED STATES PATENT OFFICE.

CHARLES F. HAWLEY, OF KANSAS CITY, MISSOURI.

IMPROVEMENT IN THE MODE OF STRENGTHENING THE ANGLES OF BENT METALLIC BARS.

Specification forming part of Letters Patent No. 115,851, dated June 13, 1871; reissue No. 4,694, dated January 2, 1872.

Specification describing an Improved Process for Strengthening Iron, invented by CHARLES F. HAWLEY, of Kansas City, in the county of Jackson and State of Missouri.

My invention relates to the manufacture of wrought angled bars of iron for hinges and other purposes, so that the fibers of the metal at the sharp angle thereof shall not be strained and weakened by the bend, but re-enforced and strengthened. The invention consists in the method or process as hereinafter fully described and subsequently pointed out in the claim.

The drawing represents a perspective view of a wrought angled bar of iron designed for the hinge of a window-shutter.

A is the vertex of the angle, formed by the bend of the strap; and B is the re-enforcement. The transverse line of bend having been laid out the metal is forced inward at and on each side of said line, except at the ends, and the strap is then bent on the same line to form the angle required. The metal around the inward corrugation takes the bend diagonally and forms an inside truss or support at the vertex.

The effect of this re-enforcement is to strengthen the angle greatly and to render unnecessary the use of increased thickness of iron thereat as heretofore practiced.

Another valuable effect is that, in strap-hinges and analogous articles, ordinary band-iron may be properly used, and thus the cost of manufacture sensibly lessened.

Having thus described my invention, what I claim as new, and desire to secure by Letters Patent, is—

The method of strengthening wrought bars of angled iron by forcing inward a portion of the metal around the vertex and between the legs of said angle to form an inward truss thereto, as described.

CHARLES F. HAWLEY.

Witnesses:
W. H. SUTTON,
J. E. HAVENS.

(119)